United States Patent [19]
Clapper

[11] Patent Number: 6,023,241
[45] Date of Patent: Feb. 8, 2000

[54] DIGITAL MULTIMEDIA NAVIGATION PLAYER/RECORDER

[75] Inventor: Edward O. Clapper, Tempe, Ariz.

[73] Assignee: Intel Corporation, Santa Clara, Calif.

[21] Appl. No.: 09/191,318

[22] Filed: Nov. 13, 1998

[51] Int. Cl.[7] .............................. G01S 5/02; H04B 7/185
[52] U.S. Cl. .............................. 342/357.13; 342/357.06; 701/208
[58] Field of Search .................. 342/190, 191, 342/357.06, 357.13; 701/208; 340/990, 995, 996

[56] References Cited

U.S. PATENT DOCUMENTS

| | | | |
|---|---|---|---|
| 5,124,915 | 6/1992 | Krenzel | 364/420 |
| 5,414,462 | 5/1995 | Veatch | 348/135 |
| 5,517,419 | 5/1996 | Lanckton et al. | 364/449 |
| 5,596,494 | 1/1997 | Kuo | 364/420 |
| 5,878,356 | 3/1999 | Garrot et al. | 701/1 |
| 5,894,323 | 4/1999 | Kain et al. | 348/116 |
| 5,904,724 | 5/1999 | Margolin | 701/120 |

*Primary Examiner*—Thomas H. Tarcza
*Assistant Examiner*—Dao L. Phan
*Attorney, Agent, or Firm*—Trop, Pruner, Hu & Miles, P.C.

[57] ABSTRACT

A recorder with a global positioning system receiver may record video frames and/or audio data in association with global positioning system coordinates. In this way, the user may readily determine the location of associated photographs taken digitally and may recreate excursions using a multimedia approach. Using mapping software, the digital images may be associated with map locations as well, so that the user may select given map locations to view associated video. By making the device of a portable size, the user may take the device on excursions and may receive information about various points which are associated on a digital map including both audio and video. At the same time, the user can create multimedia presentations about a variety of locations as the user goes from point to point.

20 Claims, 6 Drawing Sheets

DIGITAL MULTIMEDIA NAVIGATION PLAYER/RECORDER

BACKGROUND

This invention relates generally to devices for recording information about locations that may be visited in the course of travel.

In a variety of circumstances, a person must travel from point to point. At those points, there may be information which the user needs to recognize. For example, on a vacation, a tourist may travel to a variety of landmarks and at each landmark there may be particular sites which may be of note.

Devices are available to assist the traveler to recognize points of interest while on particular tour routes. For example, in zoos, travel recorders may be taken along a route. At different locations, the recorders may receive information about a local point of interest. The user receives information proximate to the point of interest about the point of interest. Thus, the user is in effect, provided with an automated guided tour for points of interest.

In addition, in a number of business applications, personnel such as repair personnel or inspection personnel who need to visit a variety of sites may also need to make note of points of interest. Personal computers may be utilized which store databases containing information about different points which need to be visited or inspected and which contain information about those various points.

However, the information provided by travel recorders is relatively limited and their ability to adapt to a variety of different excursions may be limited (if not nonexistent). Therefore, there is a continuing need for travel recorders which provide enhanced capabilities.

SUMMARY

In accordance with one embodiment, a device includes a housing and an imaging array contained within the housing together with a global positioning system receiver. A display is provided on the housing. A controller within the housing is coupled to the imaging array, the receiver and the display.

DETAILED DESCRIPTION

Figure 1:
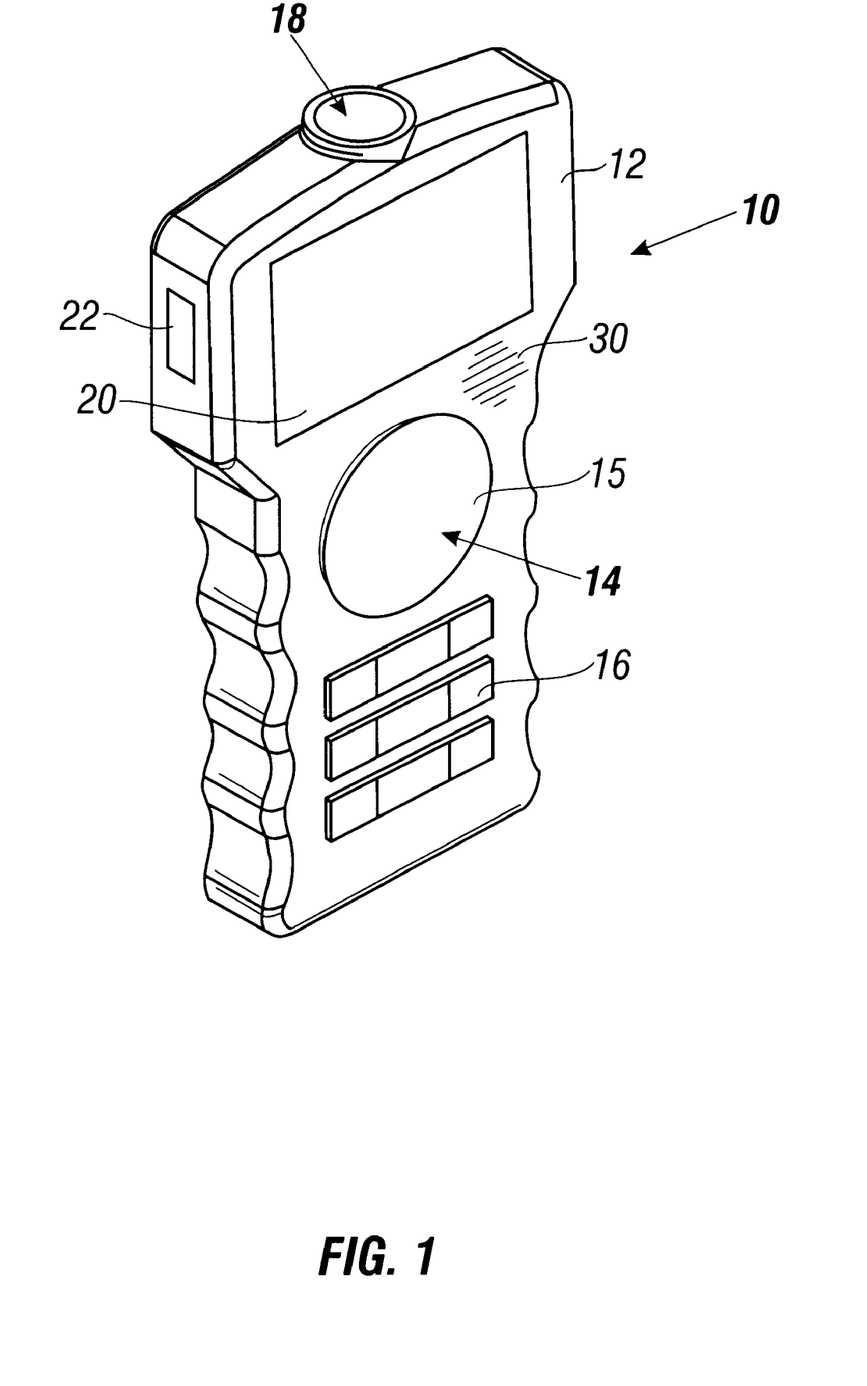
FIG. 1 is a perspective view of one embodiment of a device in accordance with the present invention.

A player and recorder 10, shown in FIG. 1, may include a housing 12 and a global positioning system (GPS) receiver 14. The GPS receiver 14 may provide current time and position information in terms of global positioning system coordinates. The recorder 10 may include a still or motion picture camera. The recorder 10 may be palm sized to be handheld in the user's palm.

A keypad 16 includes a plurality of keys to allow user inputs for controlling the recorder 10 and/or inputting data, in one embodiment in accordance with the invention. A camera lens 18 is provided in one end of the housing 12. The recorder 10 may operate on battery power. The GPS antenna may be integrated into the housing 12.

A display screen 20 may display information recorded by the camera 18 as well as GPS information such as current time and location or mapping information. The screen 20 may, for example, be a liquid crystal display (LCD).

An infrared (IR) interface 22 may be contained in one side of the device in one embodiment according to the invention. Alternatively, the device 10 may use a radio frequency (RF) link such as a cellular telephone link to communicate with other devices. Alternatively, a Bluetooth 2.4 Giga-hertz link may be used.

Figure 2:
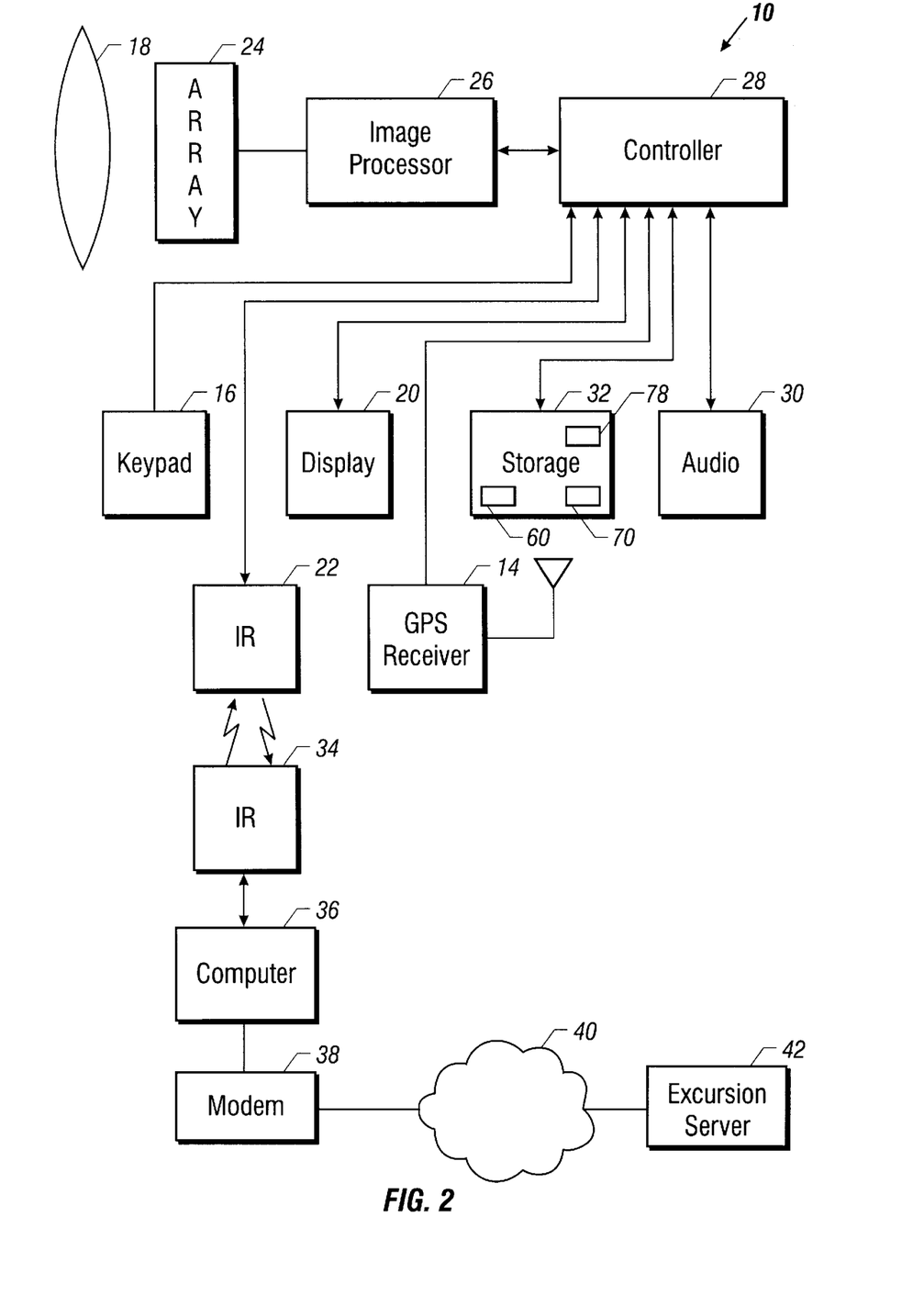
FIG. 2 is a block diagrammatic depiction of the device shown in FIG. 1 in communication with a computer which in turn communicates through the Internet.

Referring now to FIG. 2, the recorder 10 includes a lens 18 which allows light to be captured by an imaging array 24. The array 24 may, for example, use complementary metal oxide semiconductor (CMOS) sensors but other arrays may be used as well, including those using charge coupled device (CCD) sensors. The array 24 may produce light intensity signals that may be processed by the image processor 26 to recreate a depiction of an imaged scene. The image processor 26 communicates with a controller 28, providing digital information concerning the image to the controller 28. The controller 28 may in turn cause the image to be displayed on the display 20 or to be stored on the storage device 32 in some embodiments.

The controller 28 may also control the keypad 16 and an audio interface 30. In addition, the controller 68 may communicate with the storage device 32. The storage device 32 may store software for controlling the operation of the recorder 10 and it may also include storage media for storing the recorded GPS data, audio data, and digital images, in one embodiment according to the invention. Thus, the storage device may include volatile and nonvolatile memory in one embodiment. The controller 28 also receives input signals from the global positioning system receiver 14. The receiver 14 includes a GPS antenna 15 which may be disc-shaped as illustrated in FIG. 1.

The controller 28 may communicate with a computer 36 using conventional interfaces such as the infrared interfaces 22 and 34. Other useful interfaces include a serial interface through a cable, a radio frequency, or a Bluetooth interface.

A computer 36, for example a desktop computer system, may have a modem 38 for Internet 40 access to an excursion server 42 in one embodiment in accordance with the present invention. The excursion server 32, which may be at a web site in one embodiment according to the invention, may include information displayable on the display 20 about different excursions that one may take. For example, the excursion server may provide a guided tour including images, global positioning system coordinates, maps and audio information to facilitate a trip in some embodiments.

Figure 3:
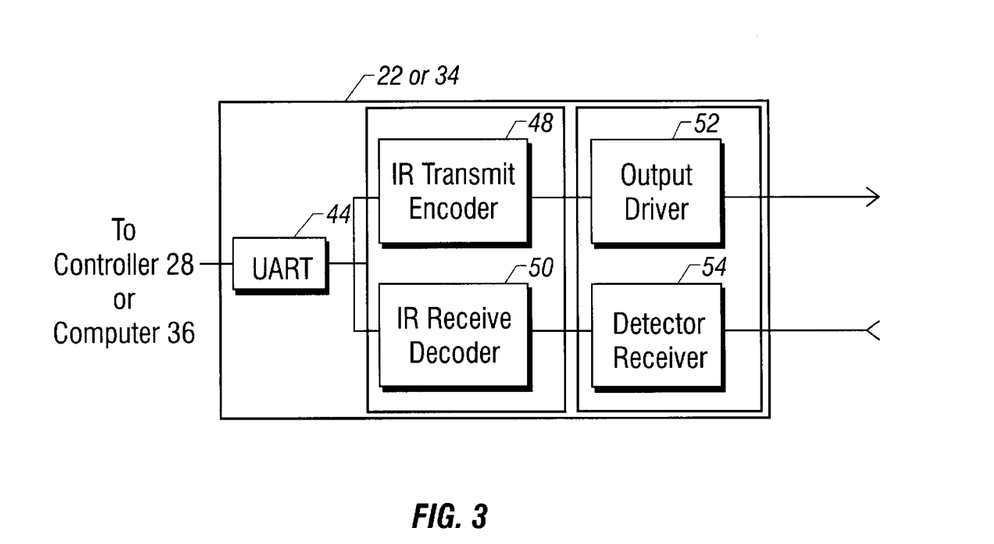
FIG. 3 is an infrared interface for the embodiment shown in FIG. 2.

Referring to FIG. 3, the infrared interfaces 22 or 34 may be implemented using a universal asynchronous receiver/ transmitter (UART) 44. The UART 44 communicates with an IR transmit encoder 48 and an IR receive decoder 50. The encoder 48 communicates with an output driver 52 which drives an IR signal through the port 22 in the case of the camera 10 or through a corresponding port in the computer 36. Similarly, the detector and receiver 54 communicates with the receive decoder 50 to receive an incoming IR signal through a port 22 for example. In accordance with the current Infrared Data Association (IrDA) specifications, higher data transfer rates may be achieved by using a communication controller in place of the UART. The IrDA specifications and standards may be found at {www.irda.org} including the Serial Infrared Link Access Protocol, Version 1.0, Jun. 23, 1994.

In one embodiment of the present invention, a radio link in accordance with the Bluetooth Global Specification for wireless connectivity may be implemented to transmit data between the recorder 10 and other devices such as a computer, a telephone or a storage device. Additional technical information describing the Bluetooth Global Specification may be obtained by accessing www.Bluetooth.com, available at the time of filing the present application. Note, the technical specifications provided at www.Bluetooth.com at the time of filing the present specification are considered a "work-in-progress" and may not represent the final specification Bluetooth.

In particular, in one embodiment of a Bluetooth implementation, Bluetooth radios operate in an unlicensed Instrumentation, Scientific, Medical (ISM) band at 2.4 GHz. A frequency hop transceiver may be applied to combat interference and fading. A shaped, binary FM modulation is applied to minimize transceiver complexity. The gross data rate is 1 Mb/s. A time-division duplex scheme is used for full-duplex transmission.

The Bluetooth baseband protocol is a combination of circuit and packet switching. Slots can be reserved fore synchronous packets. Each packet is transmitted in a different hop frequency. A packet nominally covers a single slot, but can be extended to cover up to five slots. Bluetooth can support an asynchronous data channel, up to three simultaneous synchronous voice channels, or a channel which simultaneously supports asynchronous data and synchronous voice. Each voice channel supports 64 kb/s synchronous (voice) link. The asynchronous channel can support an symmetric link of maximally 721 kb/s in either direction while permitting 57.6 kb/s in the return direction, or a 432.6 kb/s symmetric link.

The Bluetooth air interface is based on a nominal antenna power of 0 dBm. Spectrum spreading has been added to facilitate optional operation at power levels up to 100 mW worldwide. Spectrum spreading is accomplished by frequency hopping in 79 hops displaced by 1 MHz, starting at 2.402 GHz and stopping at 2.480 GHz. Due to local regulations the bandwidth is reduced in Japan, France and Spain. This is handled by an internal software switch. The maximum frequency hopping rate is 1600 hops/s. The nominal link range is 10 centimeters to 10 meters, but can be extended to more than 100 meters by increasing the transmit power.

The recorder 10 may store multimedia, such as video, audio and data files, in association with one another so that a multimedia presentation may be provided in one embodiment of the invention. For example, a digital image of a particular landmark may be stored in association with an audio description of that landmark and GPS coordinates which locate the landmark, for example.

Figure 4:
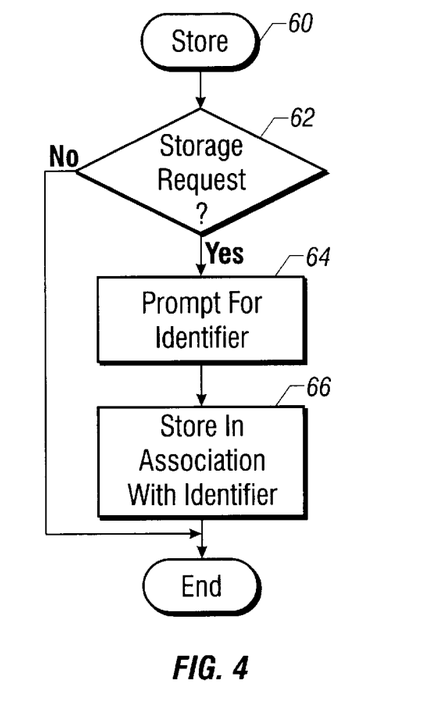
FIG. 4 is a flow chart for one embodiment of the invention.

In one embodiment, software 60, that may be stored in the storage device 32, initially may determine whether a storage request has been made by the user using the keypad 16, as illustrated in FIG. 4. If so, the user may be prompted for an identifier as indicated in block 64. The identifier may be a numerical identifier or a code word which the user may enter, for example, through the keypad 16. The prompt may include a window interface displayed on the display 20 providing a location for entering the requested identifier. However, the use of an identifier in this way is merely a non-limiting embodiment according to the invention.

The media file may then be stored in association with the identifier as indicated in block 66. Thus, a currently displayed image may be stored in association with an identifier, and the user may then provide an audio description that may be associated with the same identifier. The GPS coordinates associated with the image may also be stored so that the entire multimedia file may be accessed using the identifier to provide a multimedia presentation.

Figure 5:
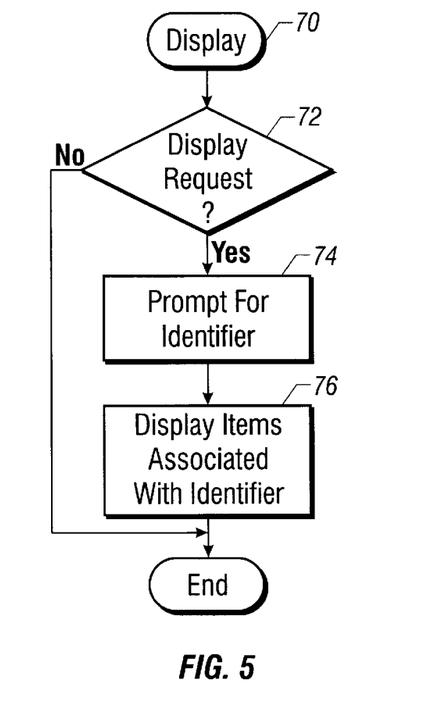
FIG. 5 is a flow chart showing one embodiment of software that plays multimedia stored as indicated in FIG. 4 in accordance with the invention.

Turning now to FIG. 5, in the display mode, display software 70, that may be stored on the storage device 32, may control the display of information recorded as described in connection with the embodiment of the invention shown in FIG. 4. Initially, the flow may determine whether a display request has occurred, as indicated at diamond 72. If so, the user is prompted for an identifier as indicated in block 74. This prompt may be requested, for example, through an on screen display window which provides a location for entry of the identifier. If the identifier is provided, the items associated with the identifier are then displayed. The display may then show a video frame and the corresponding GPS data, as illustrated by the embodiment of the invention shown in FIG. 7, and an audio file associated with the frame may be played.

Figure 6:
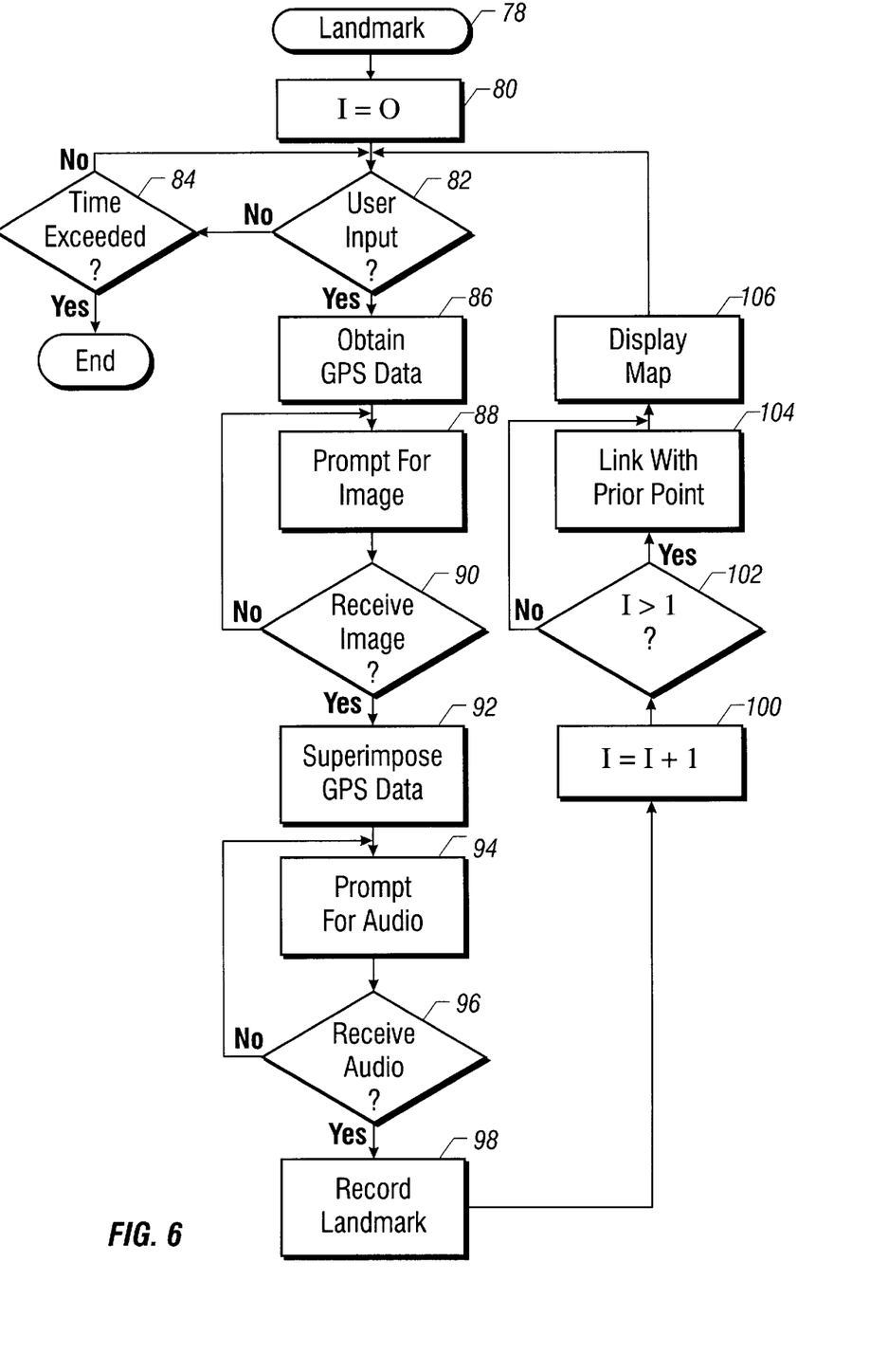
FIG. 6 is a flow chart for one embodiment of software for providing a record of multimedia stored at a variety of different locations in accordance with the invention.

Software 78 for developing a multimedia presentation that may or may not be stored in association with an identifier as described in connection with FIG. 4, is illustrated at FIG. 6. The video, audio and other data may be stored in association with the software, for example, in the form of a multimedia file for a particular excursion. That information, which may include information about a plurality of different locations, may be linked together so that it may be serially displayed or displayed in any particular order the user wishes using a map display for example to facilitate selection of the information to be displayed.

Initially, a variable may be initialized as indicated in block 80 in one embodiment. The variable may keep a count and provides a numerical identification for each of the various points that may be entered. These points may be displayed on a digital map display that may correspond to different physical locations.

When the user provides a video or audio input, as indicated in diamond 82, the current GPS data is obtained, as indicated in block 86. Conventionally, GPS data may include information about the current time, GPS coordinates for the location and the like. Next, the user may be prompted to provide one or more video frames or movie clips to be associated with the GPS data, as indicated in block 88. In other words, the user is asked to capture an image using the digital camera 10. The image may then be automatically associated by the software 78 for access together with the GPS information.

If an image is not stored, as indicated in diamond 90, the user may be prompted for image entry. Once the image is received, the GPS data may be superimposed by the software over the image. In other words, the GPS data may, in one embodiment, be provided in graphical form as an overlay or window within the digital image. Of course other options are possible including providing a separate frame which includes the GPS data such that a first frame contains the GPS data and a second frame includes the digital image. A character generator (not shown) may also be used to produce the GPS display.

The user may then be prompted to input audio as indicated in block 94. If the audio is received, as indicated in diamond 96, the information corresponding to the particular point identified, for instance by the count of the variable I, is recorded as a landmark, as indicated in block 98. Thus, whenever this point is recalled, the associated multimedia information, including audio, video, GPS and other appended data, in one embodiment in accordance with the invention, may be accessed and recalled for collective display.

The variable "I" may then be incremented, as indicated in block 100, and a check determines, in diamond 102, whether "I" is greater than 1 in one illustrative embodiment. If I is greater than 1, the camera 10 already has a prior point with associated multimedia landmark information. In this case, the new point may be linked with the prior point as indicated in block 104. The linking may simply serialize the data so that one may sequence from one point to a second point. The linking also may include associating the two points on a digital map display. A line on the display may connect the two points to indicate the user's progress from point to point. The linking also may enable the replay of the recorded multimedia data in desired sequences, including the actual sequence in which they were recorded and in which the trip may have been taken, in some embodiments.

Next, a digital map may be displayed as indicated at 106. The map may be a digital map with a point corresponding to the location of the currently recorded landmark. The flow then cycles back to await additional user inputs of additional points. A check determines at diamond 84 if no user input has been received for a sufficient period of time to end the program.

Figure 7:
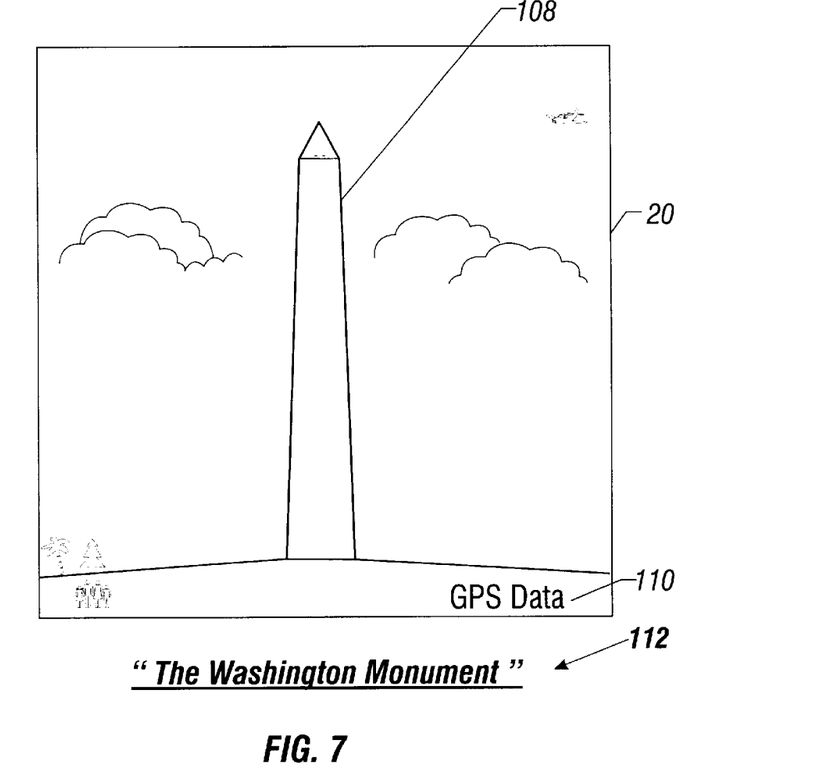
FIG. 7 depicts a screen display and associated audio in accordance with one embodiment of the present invention.

An example of one embodiment of a display in accordance with the invention, shown in FIG. 7, includes a digital image 108 on a frame that may be displayed on the display 20. The display 20 may also include textual GPS data, as indicated at 110. Audio information 112 may be associated with the screen display. In this way, a multimedia presentation may be provided.

Figure 8:
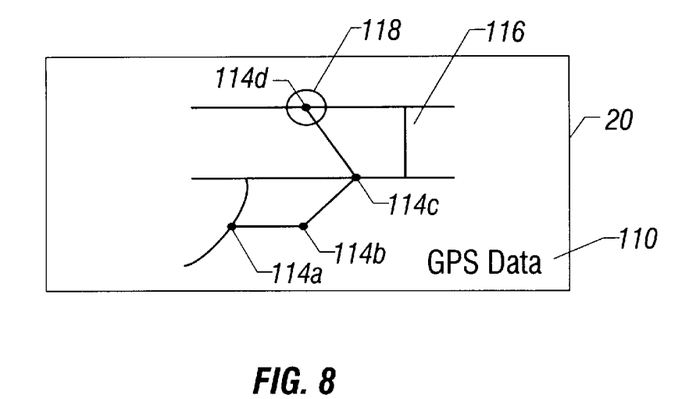
FIG. 8 shows a screen display in accordance with another embodiment of the present invention.

In a mapping mode, instead of displaying the digital frame, a map may be displayed that includes the GPS data 110, a plurality of physical landmarks such as streets 116, and a plurality of points 114 which include recorded landmark multimedia data. A circle or other icon 118 may be provided to indicate the point which is currently the subject of the ongoing multimedia display. Thus, while the audio and video associated with a particular point is being displayed, a corresponding map depiction can be selected which shows the location of the point where the video was captured in some embodiments. Thus, the user can switch back and forth from the display mode to the map mode to determine the location of the various frames. In addition, the map mode may serve as a guide to assist the user in cycling through the various points landmarks and to understand their physical association with one another.

Mapping software for use in connection with GPS receivers is well known and is commercially available from a number of different sources. The mapping software automatically generates a map of the locale around input GPS coordinates.

Figure 9:
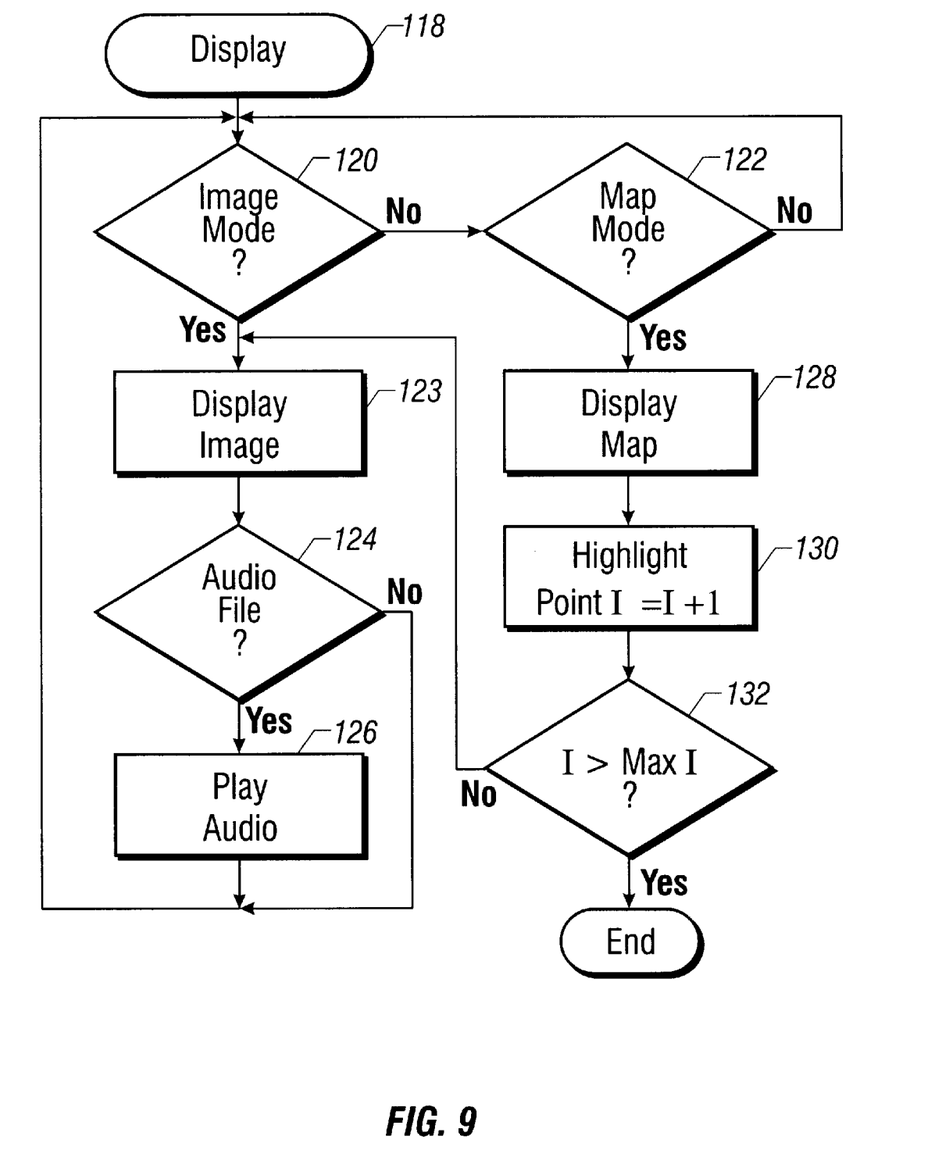
FIG. 9 shows a flow chart for software for displaying the information developed, for example, in accordance with the embodiment shown in FIG. 6.

Referring now to FIG. 9, a flow for a display mode in accordance with one embodiment of the present invention, begins by determining whether the user is in the display mode as indicated in diamond 120 or in the map mode as indicated in diamond 122.

If the user is in the display mode, as determined by keypad entries for example, a digital image associated with the selected location may be displayed as indicated in block 123. A location may be selected, for example, by entering the mapping mode, and selecting a point such as the point 114D as indicated at 118. That image or that location is automatically displayed in the display mode. If an audio file is associated with that location, as indicated by the diamond 124, the associated audio is played as indicated at 126.

If the device is in the map mode rather than the display mode as selected at diamond 122, the map depiction is displayed as indicated in 128. The map depiction may involve a display of the type shown in FIG. 8 in one embodiment of the present invention. The active display point is then highlighted, as indicated in FIG. 8, by the circle 118, as suggested in block 130. The variable I may be incremented, in one non-limiting example, to automatically go to the next point in the display along the course depicted on the map mode display. The user may then switch to the display mode to see the images corresponding to mapped points 114. If the user has cycled through all of the predetermined points on the map (diamond 132), then the flow is ended. Otherwise, the flow cycles back through the corresponding displays associated with each map point.

The software illustrated in FIG. 9 may also be utilized to play prerecorded multimedia presentations recorded in the formats suitable for use with the recorder 10. For example, the recorder 10 may be coupled to a computer 36 to access information from the Internet 40. Preprogrammed excursions may then be downloaded from the excursion server 42 and stored in the storage device 32. Then, the user can take the excursion, following the digital map provided by the excursion server. The information may also be accessed over a direct modem connection or through a network connection.

When the user's GPS coordinates match the coordinates provided by the excursion server, the user can display video and audio information which may describe those locations. In this way, the user can take a guided multimedia tour without having a personal guide go on the trip.

The recorder 10 may also provide navigation assistance. For example, the user may enter another landmark or position and the recorder may automatically calculate the direction to travel to that landmark and the distance and/or time to arrive there. Thus, the recorder 10 uses its current GPS coordinates and the stored coordinates of the selected landmark to provide vector information to guide the user to the requested landmark.

For example, in the map mode, the user may simply enter a given location indicated on the map and the recorder automatically calculates the vector to travel to that location. The entering of the selected landmark may be done using a conventional pointer controlled by the keypad 16 or in a display in which a plurality of landmarks are numbered, the user can simply select the landmark number to get the vector to the next location. The landmark number may be entered on the keypad 16.

While embodiments have described in which audio, GPS, and video information are linked to enable multimedia presentation of that data upon selection by the user, other data may also be linked to this data. For example, linked data files may be provided to give the user additional information about a particular landmark. This information may include the time that the user arrived at the landmark in the past, the weather at the landmark when the user was there, altitude, temperature, moisture or other information which could be entered by the user or collected using appropriate sensors associated with the recorder 10.

Data may be provided bi-directionally to and from the recorder 10. For example, existing landmark descriptions including audio and video data may be downloaded to the recorder 10 to allow the user to follow an existing course. In addition, a series of landmarks entered by the user in the course of travel, may be uploaded to a computer, a network, or the Internet through telephone, infrared, or radio frequency links.

In at least one embodiment of the present invention, it is advantageous to not only link the data associated with a particular landmark, but also to link a plurality of landmarks together in a data sequence. This facilitates moving from one landmark to another in an easily selectable pattern. For example, the user may simply press an up or down arrow button to move from one landmark to the next if the data is stored in a linked sequence. The linked sequence may be composed of a potential or planned excursion so that the user can progress from landmark to landmark in the preprogrammed sequence.

Alternatively, with a cellular telephone link, excursion information may be downloaded from the excursion server directly to the recorder 10 either by a direct modem link or over the Internet, as examples. An infrared or radio frequency link may be used for these communications. In addition, the cellular link may also be useful to upload multimedia information for storage at a remote location in one embodiment. The storage device 32 may include a reduced sized hard disk drive such as the IBM® 170 megabyte and 340 megabyte microdrives that operate from battery power. Nonvolatile storage may also be provided.

Although the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for storing and retrieving information comprising:

obtaining global positioning system coordinates;

linking the global positioning system coordinates with a digital image captured at the location of said coordinates;

displaying the corresponding digital image when a location is selected;

downloading information about a plurality of locations including video information and global positioning system coordinates for each of said locations; and displaying the video information associated with a particular location upon selection of the location by the user.

2. The method of claim 1 further including providing a digital map.

3. The method of claim 1 further including obtaining audio information and linking the digital image, the coordinates and the audio information.

4. The method of claim 2 wherein providing a digital map includes providing a digital map with at least two points indicated on said map, a different digital image linked with each of said points.

5. The method of claim 2 further including selectively displaying a digital map and a digital image associated with a location on the map.

6. The method of claim 4 including providing a vector from a present position to a desired location.

7. The method of claim 1 including downloading said information about said location from the Internet.

8. The method of claim 1 including linking to a computer, downloading said information from the Internet, receiving said information over a wireless link to a handheld unit, and displaying said information on said handheld unit.

9. The method of claim 7 including maintaining information about a plurality of landmarks in a particular sequence.

10. The method of claim 1 further including prompting a user to capture said digital image.

11. An article comprising a medium for storing instructions that cause a computer to:

obtain global positioning system coordinates;

link the global positioning system coordinates captured at the location of said coordinates;

display a corresponding digital image when a location is selected;

download information about a plurality of locations including video information and global positioning system coordinates for each of said locations; and display the video information associated with a particular location upon selection of the location by the user.

12. The article of claim 11 further including instructions that cause a computer to provide a digital map.

13. The article of claim 11 further including instructions that cause a computer to obtain audio information and link the digital image, the coordinates and the audio information.

14. The article of claim 12 wherein the instructions that cause a computer to provide a digital map include instructions that provide a digital map with at least two points indicated on the map, a different digital image linked with each of said points.

15. The article of claim 12 further including instructions that cause a computer to selectively display a digital map and a digital image associated with a location on the map.

16. The article of claim 11 further including instructions that cause a computer to play audio information associated with a particular location.

17. The article of claim 11 including instructions that cause a computer to download said information about said locations from the Internet.

18. The article of claim 17 including instructions that cause a computer to link to another computer, download said information from the Internet, receive said information over a wireless link to a handheld unit, and display said information on said handheld unit.

19. The article of claim 11 including instructions that cause a computer to store information about said locations for display in a programmable sequence.

20. The article of claim 11 including instructions that cause a computer to upload to a network information about a plurality of locations including video information and global positioning system coordinates for each of said locations.

* * * * *